March 29, 1966  J. PARSTORFER  3,243,519
ELECTROMAGNETIC TRANSDUCER WITH TWISTED WIRE CORE
Filed April 6, 1961  9 Sheets-Sheet 1

INVENTOR.
JOHN PARSTORFER
BY
Carl Fissell Jr.
AGENT

Fig. 10

INVENTOR.
JOHN PARSTORFER
BY
Carl Fissell Jr.
AGENT

March 29, 1966     J. PARSTORFER     3,243,519
ELECTROMAGNETIC TRANSDUCER WITH TWISTED WIRE CORE
Filed April 6, 1961     9 Sheets-Sheet 3

INVENTOR.
JOHN PARSTORFER
BY
Carl Fissell Jr.
AGENT

INVENTOR.
JOHN PARSTORFER
AGENT

March 29, 1966     J. PARSTORFER     3,243,519
ELECTROMAGNETIC TRANSDUCER WITH TWISTED WIRE CORE
Filed April 6, 1961     9 Sheets-Sheet 5

INVENTOR.
JOHN PARSTORFER
BY
*Carl Fissell Jr*
AGENT

INVENTOR.
JOHN PARSTORFER
AGENT

March 29, 1966     J. PARSTORFER     3,243,519
ELECTROMAGNETIC TRANSDUCER WITH TWISTED WIRE CORE
Filed April 6, 1961     9 Sheets-Sheet 7

INVENTOR.
JOHN PARSTORFER

BY

*Carl Fissell Jr.*
AGENT

March 29, 1966 J. PARSTORFER 3,243,519
ELECTROMAGNETIC TRANSDUCER WITH TWISTED WIRE CORE
Filed April 6, 1961 9 Sheets-Sheet 8

INVENTOR.
JOHN PARSTORFER
BY
Carl Fissell Jr.
AGENT

United States Patent Office 3,243,519
Patented Mar. 29, 1966

3,243,519
ELECTROMAGNETIC TRANSDUCER WITH
TWISTED WIRE CORE
John Parstorfer, Philadelphia, Pa., assignor to Burroughs
Corporation, Detroit, Mich., a corporation of Michigan
Filed Apr. 6, 1961, Ser. No. 101,292
4 Claims. (Cl. 179—100.2)

The present invention relates generally to electromagnetic transducer apparatus, and to electromagnetic transducers which have improved operating characteristics at extremely high frequencies. More particularly, it is concerned with electromagnetic transducer construction wherein plural information may be recorded and/or picked up from a plurality of independent closely spaced data tracks on a record member by means of a unitary multichannel electromagnetic transducer assembly.

With still more particularity, the present invention is concerned with certain fabrication techniques for producing individual electromagnetic transducers capable of operating in the foregoing manner by providing a read-record head structure which is adapted to read or write information on record media such, for example, as tapes, drums or discs. In addition, the present invention is concerned with a novel multichannel electromagnetic transducer assembly including a plurality of read-record heads in which each head may be made in extremely small sizes and at less expense than analogous heads known heretofore, and which effect a greater economy of magnetic materials than has been the case in the past. In this latter respect the present invention is further concerned with novel manufacturing techniques which result in greater accuracy of alignment of the several structural portions comprising the head, as well as in a greater facility in the handling of smaller bodies of magnetizable or magnetic material.

It is an important object therefore of the present invention to provide an improved magnetic transducer.

Another object of the present invention resides in the construction of novel multichannel magnetic transducer assemblies.

A further object of the present invention resides in the provision of novel manufacturing techniques for the construction and hermetic encapsulation of small electromagnetic read-write heads, either singly or in multiples.

In accordance with the foregoing objects and first briefly described, the present invention comprises in one of its important aspects an electromagnetic transducer wherein a plurality of magnetizable elements are secured together into a bundle, axially twisted one or more times throughout their length, provided wtih a plurality of turns of electrical conductors which are distributed therealong, circularly bent to bring the ends into parallel abutting arrangement with a shim of non-magnetic material disposed in the gap therebetween, after which the ends are fastened together and the assembly is hermetically encapsulated to form a sealed miniature electromagnetic transducer assembly.

In accordance with the foregoing objects, the present invention also comprises in another of its aspects a multichannel electromagnetic transducer assembly forming a "stick" or recording "bar" of electromagnetic transducers disposed in a row.

In another of its aspects the invention comprises an assembly of parallel rows of electromagnetic transducers wherein the transducers of one row have their operating gaps offset from the operating gaps of the next adjacent parallel row whereby the center-to-center spacing between the gaps of the various rows of transducers may be relatively small, on the order of .050 inch, thus to provide interlaced sensing of the information from a record member.

Another important aspect of the invention is the provision of a novel method of manufacture or fabrication of individual electromagnetic transducers.

The foregoing objects and advantages, construction and operation of the present invention will become more readily apparent from the following description and accompanying drawings in which.

Figure 1:
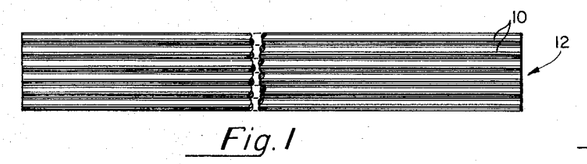
FIG. 1 represents a portion of a bundle of electrical conductors for use with the present invention.
Figure 2:
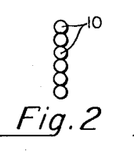
FIG. 2 is an end view of the bundle of conductors of FIG. 1.
Figure 3:
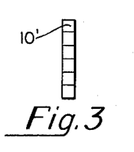
FIG. 3 represents an end view of a bundle of conductors having a square cross-sectional configuration.

Referring now to FIGS. 1 through 9, which will be described conjointly in detail, there is seen a plurality of magnetizable elements, such as insulated magnetic wires 10, which are brought together into parallel, side by side arrangement to form a flat bundle or group 12 with each element lying closely adjacent, i.e., touching each adjacent conductor. The configuration shown in FIG. 1 includes six elements, however, the number of elements is a matter of choice, depending on the size, e.g., diameter of the individual elements and the ultimate over-all size of the individual transducer assembly which is to be formed thereby. In the present preferred embodiment this bundle or group 12 of magnetizable wires may be of molypermalloy annealed material and may be stretched out longitudinally for several feet, flat and parallel, touching side by side as before mentioned. Oxide insulation around each wire is desirable to give lamination effects. The diameter of such magnetic wire is approximately .002 to .006 inch, FIG. 2. The wire may also be square-shaped as seen in FIG. 3.

Figure 4:
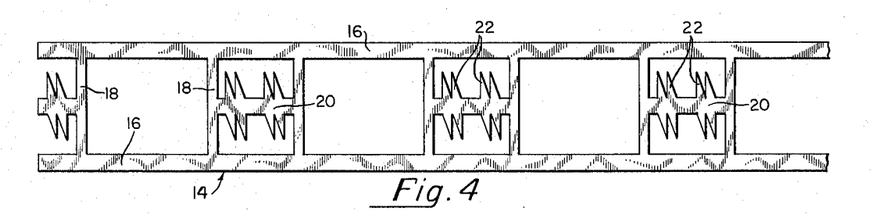
FIG. 4 is a plan view of a clamping and supporting ribbon for use with the present invention.

A clamping and/or supporting ribbon 14 etched, punched, or otherwise preformed, out of .001 or .002 inch brass or other similar shim stock material is provided, including elongated parallel portions 16 having transverse, parallel pairs of cross members 18 extending therebetween and located at regular intervals throughout its length. From a central portion 20 interconnecting each pair of transverse cross members 18, sets of double spikes 22 project in opposite directions away therefrom. the number of clamping spikes can be chosen to suit the convenience of the design and may be more or less than that illustrated herein.

Figure 5:
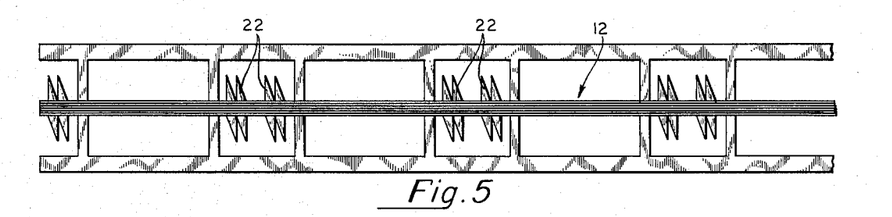
FIG. 5 is a view illustrating the manner in which the conductors are overlayed on the supporting ribbon.
Figure 6:
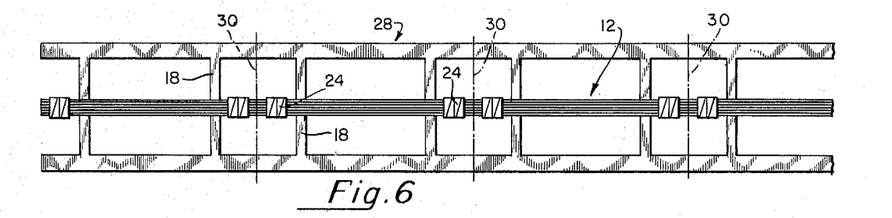
FIG. 6 is a view illustrating the manner in which the holding members of the supporting ribbon are clamped over the bundle of conductors and shows the individual segments which are removed therefrom.
Figure 7:
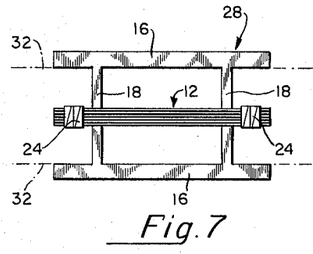
FIG. 7 is a view of one of the segments of FIG. 6.

The clamping ribbon 14 may be placed beneath the core forming bundle 12 or conversely, the bundle 12 may be laid over top of the shim stock 14, parallel to the portions 16–20 as seen in FIG. 5. The spikes 22 are then crimped over the wires 10, as indicated by reference character 24 in FIG. 6, and may, if desired, be adhered thereto as by a drop of liquid cement 26, FIG. 9, for example. One section 28 at a time may then cut along the cutting lines 30—30, FIG. 6, and is separated from the assembly as seen in FIG. 7.

The proper and/or desired assembly length is provided by the prefixed distance between adjacent pairs or sets of parallel cross members 18—18. Obviously, this length may be varied to fit the particular size of the transducer assembly which is to result therefrom. The upper and lower parallel portions 16—16 are then clipped off along the cutting lines 32—32 (FIG. 7) producing the open assembly of FIG. 8. The vertically disposed cross pieces 18 remain for easier handling and support as well as to prevent or lessen skewing of the individual magnet wires 10 during clamping in the handling apparatus to be described in detail hereinafter.

Referring now to FIGS. 10 through 14, there is shown a coil winding and wire twisting apparatus 36 for use in further fabrication of the transducer of the present invention. The core winder 36 comprises a base or frame 38 from which a pair of vertically disposed supporting pedestals 40–42 project. Each pedestal is drilled, FIGS. 11–13, to receive the respective opposite shaft ends 44 and 46 of a cylindrical or barrel-like gear member 48. A spring 50 slidably received in an elongated aperture 52 in pedestal 42 biases the gear member 48 leftwardly, FIGS. 11 and 13, whereby the barrel gear is transversely slidable left and right. The opposite shaft end 44 of the barrel gear 48 terminates in an enlarged collar 54 integral with a drive wheel 56 having a handle 58 projecting therefrom for hand rotation thereof for purposes to be disclosed hereinafter. Disposed immediately behind the pedestals 40 and 42, and projecting also upwardly away from the base 38 is a second set of pedestals 60 and 62, in which shafts 64 and 66 are journaled in a known fashion.

A rotatable toothed gear wheel 68 is mounted on shaft 64 for rotation therewith. The teeth 70 of gear 68 are in mesh with the teeth 72 of the drum or barrel gear 48. A toothed gear wheel 74 mounted on shaft 66 for rotation therewith also has its teeth 76 in mesh with the teeth 72 of gear 48. Shafts 64 and 66 are each provided with an axial bore 78–78' (FIG. 12) throughout their respective lengths for purposes to be explained hereinafter. Pedestal 62 is provided with a set screw 80 normally holding gear 74 fixed. When this screw is loosened however, gear 74 may then be manually slidably, adjustable relative to gear 48 so as to vary the spacing between the two gears 68 and 74 permitting, among other things, varying length transducer assemblies to be accommodated thereby.

Figure 14:
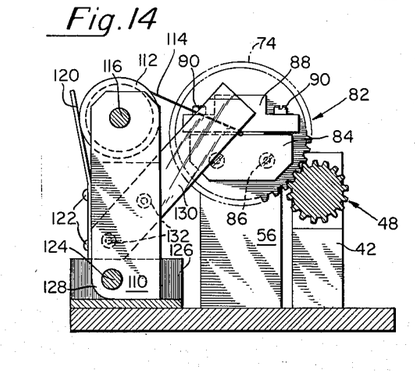
FIG. 14 is a sectional view along the line 14—14 of FIG. 13.

Each gear 68 and 74 is provided with an adjustable chuck or jaw-like arrangement 82, FIG. 14, on its exposed face. Each chuck 82 includes a fixed block 84 secured as by screws 86 to the face of a respective gear 68 and 74. A movable jaw element 88 is adjustable relative to block 84 by means of bolts 90—90.

Figure 13:
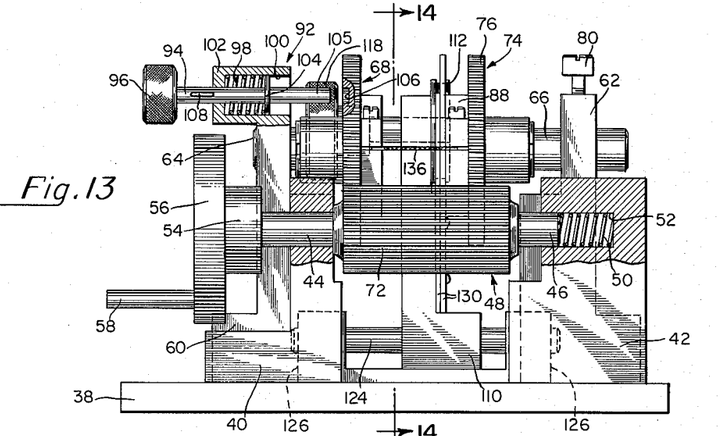
FIG. 13 is a view similar to FIG. 11 but showing the apparatus as used during a winding operation.

In order that gear 68 may be fixed or rotatable at will relative to barrel gear 48 a lock or detent 92 is provided therefor. Detent 92 includes an elongated plunger member 94, the enlarged end portion 96 of which is knurled thus to provide handling means therefor. Plunger 94 is slidably movable back and forth against the tension of a coiled spring 98, within the bore 100 of the receptacle or chamber 102. A collar 104 of plunger 94 retains the spring 98 within the receptacle 102. The projecting end 105 of plunger 94 is receivable within a depression or recess 106, FIGS. 11 and 13, in the side of gear 68 and when engaged therewith holds the gear 68 in a fixed position. A latch 108 on plunger 94 permits the plunger end to be held in a retracted position out of the recess 106, as seen in FIG. 13, so that either one or both gears 68 and 74 can engage gear 48 as desired.

Figure 10:
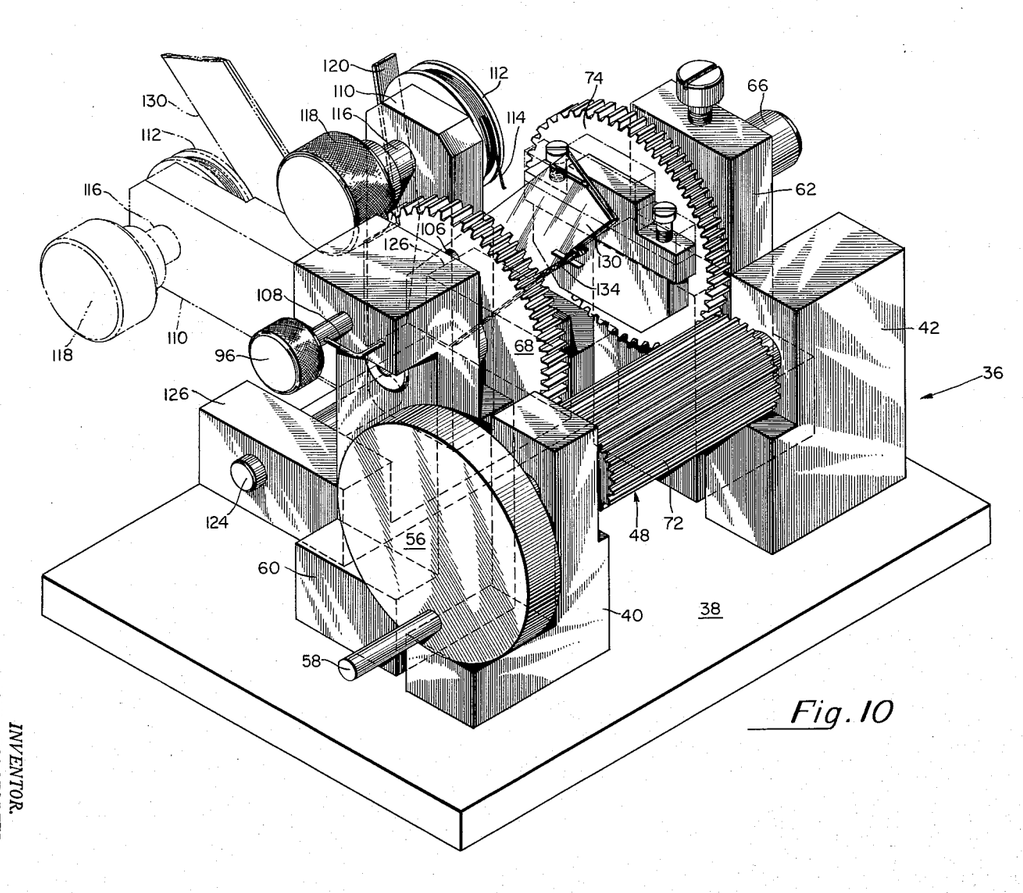
FIG. 10 is an isometric view of a twisting and winding apparatus for the present invention.
Figure 11:
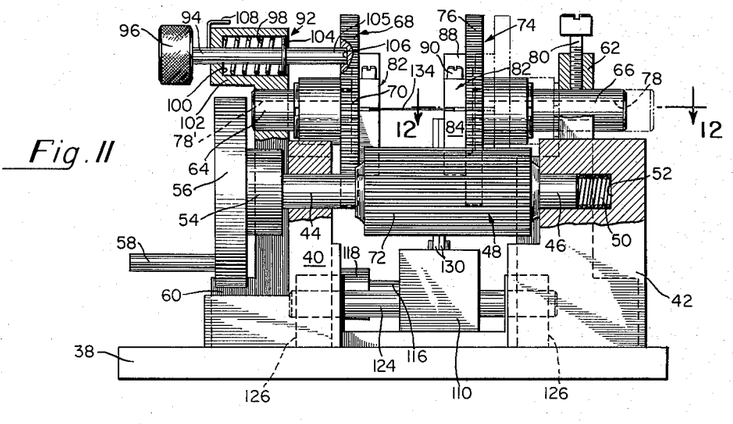
FIG. 11 is a front elevational view of the apparatus of FIG. 10 as used during a twisting operation.

Located directly behind the second pair of pedestals 60 and 62 is a vertically disposed post 110, FIGS. 10 and 14. A detachably mounted rotatable wire spool 112, carrying a supply of conductive wire 114, has its shaft 116 journalled for rotation in the upper end of the post 110. A knurled latch 118, FIG. 10, on the end of the shaft 116, permits the supply spool to be hand rotated and/or removed at will. A resilient, flexible member 120, secured by screws 122 to the post 110, is angled over the spool rims so as to press thereagainst and in this manner apply tension to the coiled wire 114 on spool 112 thus preventing accidental withdrawal or unwinding thereof.

The post 110 is pivotally mounted at its bottom portion on a cross shaft 124 press fitted at its opposite ends in blocks 126—126 which are attached to the base 30, FIG. 10. The rearwardly facing bottom edge 128 of the post 110 is arcuately chamfered as shown in FIG. 14, so that the post may be rocked from its full to its broken line position, FIG. 10, for maintenance or change of supply spool, etc. The post 110 is transversely slidable along the shaft 124 left to right and return, FIGS. 10, 11 and 13, and carries a further wire feeding tensioning, guiding and distributing means provided by a pair of relatively thin, flat, elongated, parallelly disposed members 130—130 of suitable flexible material so as not to scratch or otherwise abraid the insulation as the wire is moved therebetween. The members 130—130 of plastic, for example, are secured, as by screws 132 to the post 110 and are angled slightly away therefrom and over the bundle 12 of wires, FIG. 14. The foregoing construction permits the wire 114 to be distributively payed out away from the supply spool 112.

Figure 8:
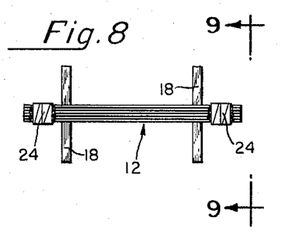
FIG. 8 is a view of the supporting ribbon of FIG. 7 with the excess material removed.
Figure 9:
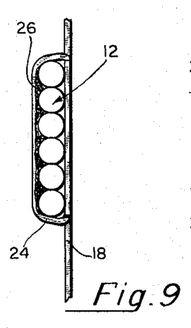
FIG. 9 is a view along line 9—9 of FIG. 8.
Figure 12:
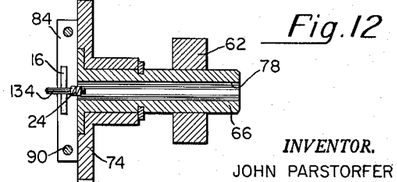
FIG. 12 is a view across the line 12—12 of FIG. 11.
Figure 15:
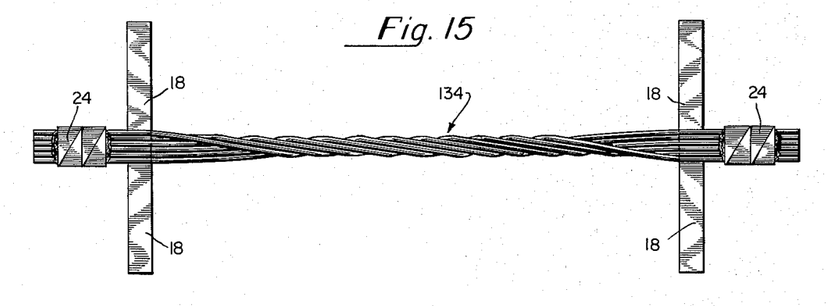
FIG. 15 is a view showing the manner in which the bundle of conductors is twisted or wound by the apparatus of FIG. 10.

Returning again to the fabrication of the transducer assembly, the bundle of wires 12, as seen in FIG. 8, is now placed in the winding apparatus 36, FIG. 10, so that the bound ends 24 project slightly into and between the faces of blocks 84 and 88 of the chuck 82 in the manner shown in FIG. 12. Thereafter the bolts 90—90 are tightened on each chuck so as to securely retain the ends 24—24 of the wire bundle 12 therebetween. Detent 92 is released so that plunger 104 is engaged in the recess 106 of the gear 68 holding the latter fixed, FIG. 11. The hand wheel 56 is pushed rightwardly, FIG. 11, against the tension of spring 50, sliding gear 48 out of engagement with gear 68. Thereafter the hand wheel is rotated so as to twist the wire bundle 12 approximately two complete revolutions about itself, as indicated by reference character 134, FIG. 15, with just a slight amount of over travel in order to offset the "spring back" effect as the wires relax after the ends are removed later on from the jig 36. This twisting operation guarantees that the ends 24—24 of the bundle will remain parallel to each other so that the wires continue in the same direction at each end after the twisting is accomplished. The wires are twisted as a convenience in handling and forming them into a circular shape, to be described hereinafter, without making extra provisions for such shape.

Additionally, the twisting operation produces a desirable and useful cancelling effect relative to the stresses and the strain concentrations which build up by virtue of the fact that the individual wires in the bundle effectively change position from inside to outside along the curve of the circle as the bundle is circularly bent in the manner hereinafter described.

An induction coil 136, providing an energizing winding for applying a current or voltage level to the transducer assembly, may be wound therearound in the manner hereinafter described. Detent 92 is moved leftwardly, FIG. 13, and member 96 rotated slightly to lock plunger 104 out of engagement with gear 68. Barrel gear 48 is then moved leftwardly under urging by spring 50, FIG. 14, thereby engaging its teeth 72 with both gears 68 and 74. Pose 110, FIG. 14, is in its broken line position, FIG. 10. A leader or short length of wire 114 is then withdrawn from the spool 112 and passed between the guides 130—130 and its end either is secured to the bundle 12 or the end may be passed once around the bundle 12 and temporarily hand held.

By means of the knurled knob 118 the supply spool 112 is rotated counterclockwise so as to move the post 110 into the vertical position, FIG. 14, during which movement of the wire guides 130—130 approach and pivotally rest firmly but lightly against the twisted wire bundle 134. This tensioning means provides an even pull on the wire 114 and since the parallel guides 130—130 ride right over the wire bundle while distributing the coils therealong, the bundle cannot bow or deform axially throughout its length as it might otherwise do without such means. Also the foregoing arrangement permits each coil to be laid evenly adjacent each other coil during the back and forth movement of the post 110 in distributing the windings turns of wire 114. Wheel 56 is then rotated mechanically or by hand so as to apply winding turns of wire 114 thereto. As the wire 114 is unwound and payed away from the spool 112, the post 110 is manually slid back and forth along the shaft 124. The tensioning member 120 pressed against the rims of the spool of wire prevents the wire from being accidentally released from the spool and provides additional tension thereon so that the wire is tightly applied around the transducer wire bundle 12.

By means of the wire feeding and distributing apparatus just described, approximately one to two hundred turns of wire, loosely spaced and in several layers (FIG. 16) is wound around the core forming wire bundle 12. The winding turns may constitute either the read and/or write induction coil or both, as the case may be. This induction winding aids in retaining the wires in a tightly compacted bundle without other external support or fixtures and it also prevents the wires from flattening out as they would normally tend to do after the bending procedure next to be described.

Figure 16:
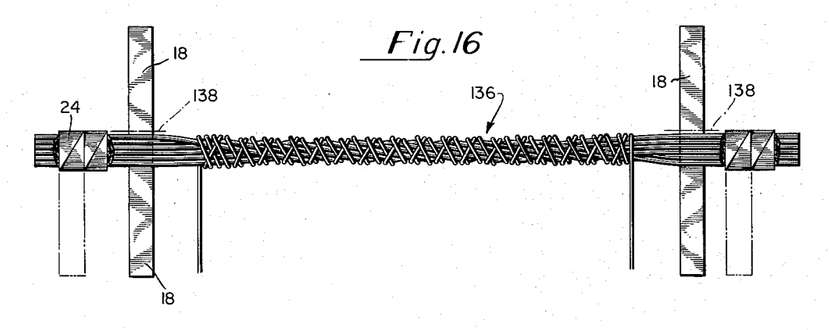
FIG. 16 is a view showing the manner in which the energizing windings are applied to the conductors forming the core of the transducer.
Figures 17, 18:
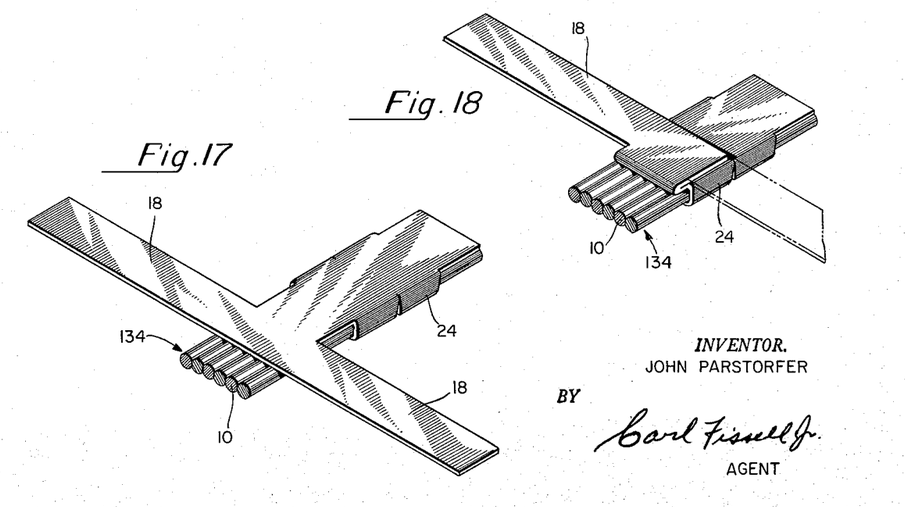
FIGS. 17 and 18 are views illustrating the manner in which the bundle of conductors is end formed.

After the windings have been applied, the portions 18—18 of the cross bars are bent outwardly (FIG. 16) away from the central core body, from the full to the broken line positions (FIGS. 16–18) and the remainder is pressed back upon itself (FIG. 18). The material is severed along the cutting line 138—138.

Figures 19, 20, 23:
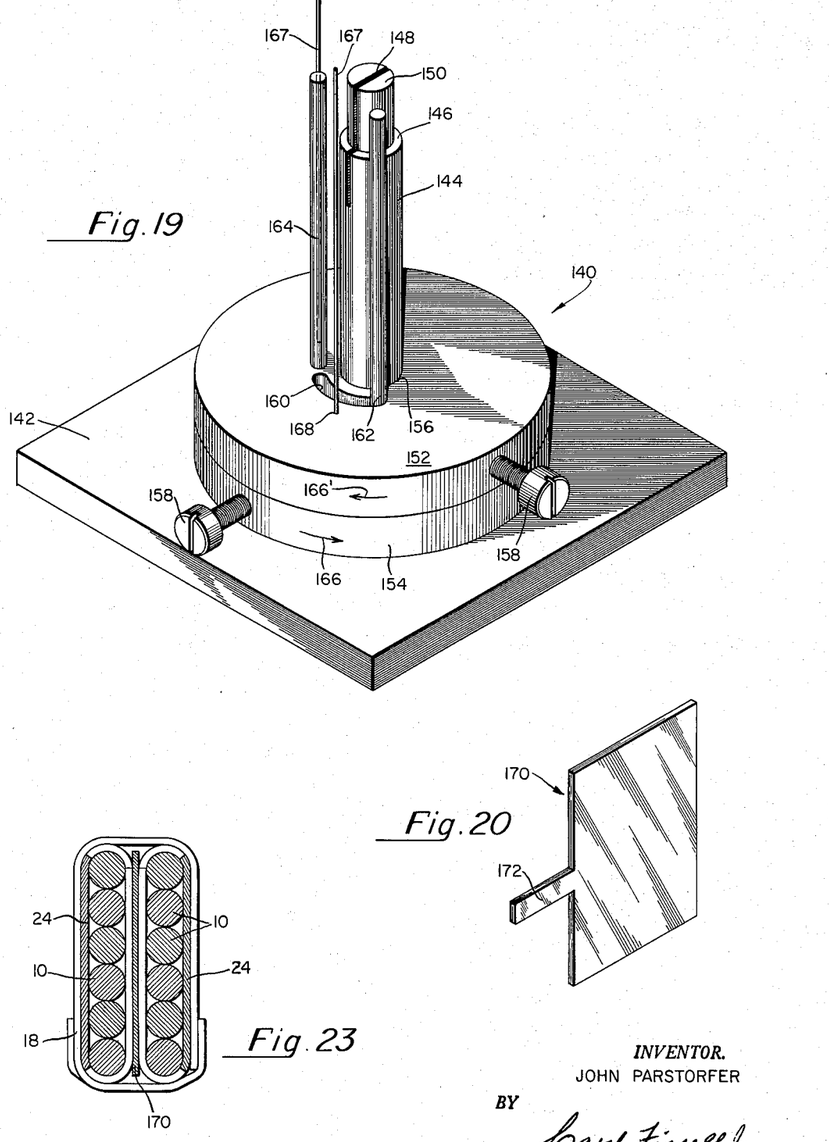
FIG. 19 is an isometric view of a holding and forming jig or fixture for use with the present invention.
FIG. 20 is a detail view of an air gap shim.
FIG. 23 is an enlarged sectional view of one end of an assembled transducer.

The core forming assembly is then circularly bent into a substantially horseshoe shape by means now to be described, so that its flat pole-forming ends 24—24 may be positioned parallel to one another. For these purposes, a transducer bending and forming jig or fixture 140, FIG. 19, is seen to comprise a base 142 from which projects a central vertically disposed cylindrical member or rod 144. The upper end of rod 144 is undercut to provide a shoulder or ledge 146 and is further provided with a transverse slot 148 extending axially downwardly from the end 150 and some distance below the shoulder 146. An upper and a lower disc 152 and 154, respectively, are mounted over the rod 144 via apertures 156. Each disc has a set screw 158 for adjusting the angular position of the discs relative to each other and to the rod 144. An arcuate slot 160 is provided in each disc adjacent the central aperture 156. Each disc carries a vertically disposed post 162 and 164 respectively. Post 164 is made fast to the top disc 152, while post 162 is secured to the bottom disc 154 and extends vertically upwardly through the arcuate slot 160 in disc 152. From the foregoing it may be seen that movement of the set screws toward one another in the direction of the arrows 166–166' will cause the discs to rotate in opposite directions to bring the two posts 162 and 164 together in substantially abutting relation—the post 162 moving freely in slot 160—for purposes to be explained presently. As will be pointed out hereinafter, a pair of wire terminal attachment members 167—167 may be slip-fitted into holes 168—168 in upper disc 152 for employment later on in the fabrication of the transducer assembly.

Figure 21:
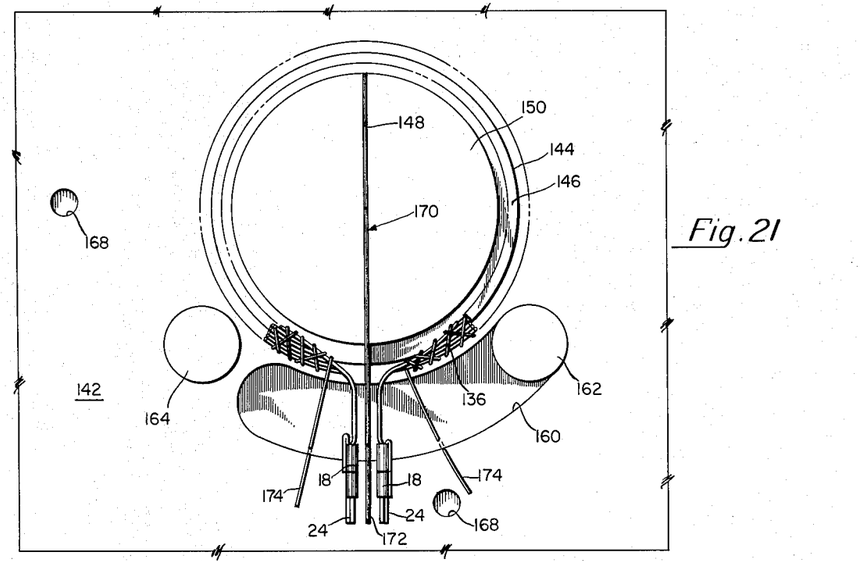
FIGS. 21 and 22 are views illustrating the use of the jig of FIG. 19.
Figure 22:
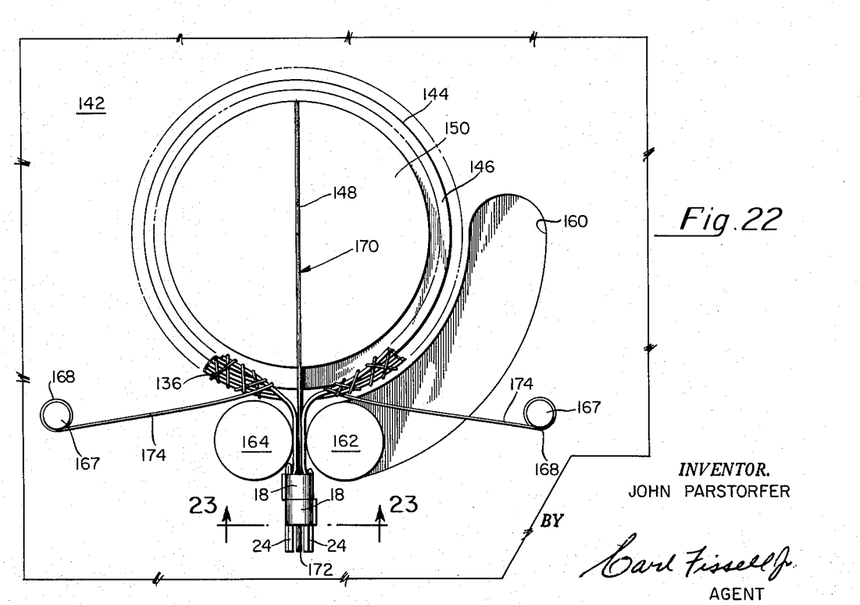
Figure 24:
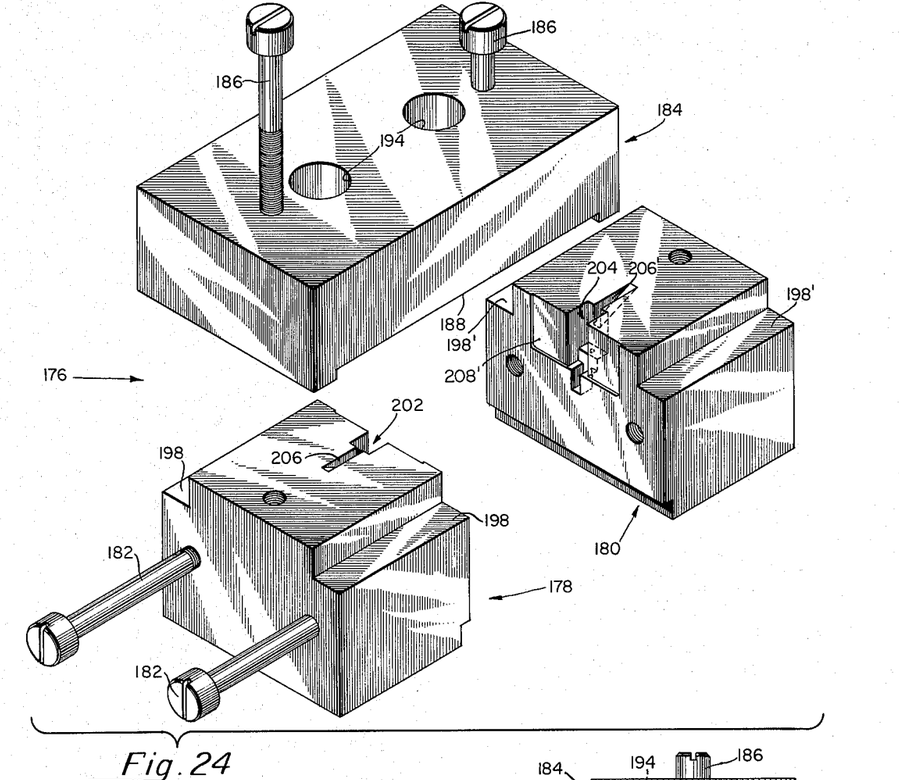
FIG. 24 is an exploded view of an encapsulating jig for the present apparatus.

The assembly of FIG. 16 is now bent slightly arcuately by hand and then located over the member 144, FIG. 21, so as to seat or rest upon the shoulder 146 with the ends 24—24 extending horizontally away from the member 144. A non-magnetic spacing shim 170, FIG. 20, of substantially rectangular shape and formed with a central projection or tab 172, is located in the slot 148 with the tab disposed in the air gap or space between the confronting ends 24—24 as seen in FIGS. 21 and 22. The shim may be of any suitable non-magnetic material, such for example, as silver or copper, etc.

The discs 152 and 154 are then rotated in opposite directions, as before described, to bring the two pins 162 and 164 together thereby causing the ends 24—24 to be drawn tightly against the opposite sides of the spacing shim 170. The ends 24—24 are then bound to the shim as by wrapping the excess metal tabs 18—18 in reverse directions therearound, FIG. 22, thus producing a constant and even pressure against the pole ends 24—24. This construction results in an end configuration as seen in FIG. 23. The free ends 174—174 of the induction coil 136 are then attached in suitable fashion, as by soldering, to the earlier mentioned removable terminal forming conductors or pins 167—167 vertically disposed in the holes 168—168 in the upper disc 152. The transducer assembly is now ready to be hermetically encapsulated, as will next be described.

As seen most clearly in FIGS. 24 through 28, which will be discussed simultaneously, an encapsulation molding jig or fixture 176 for the present invention includes three main sub-assemblies including mating blocks 178 and 180 which are adapted to be secured together by means of bolts 182—182, and a cap or cover member 184 which is attached by bolts 186 to the other two members.

Figures 25, 26:
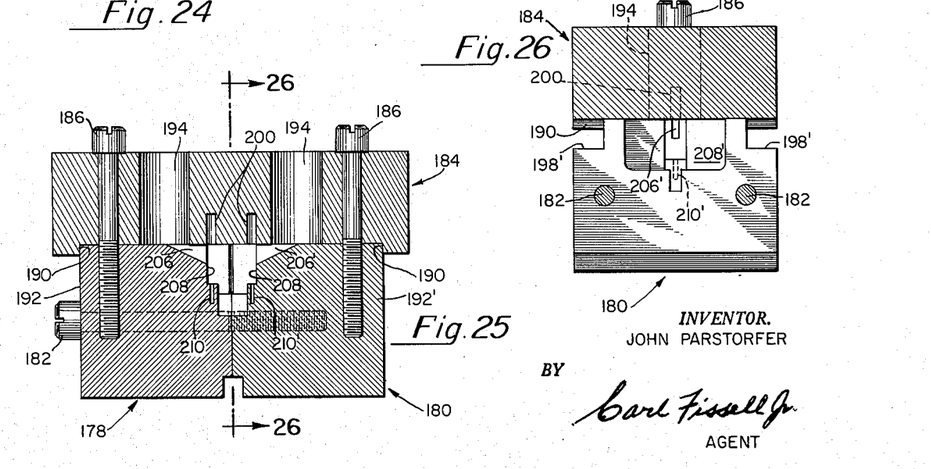
FIG. 25 is a sectional view of the assembly of FIG. 24.
FIG. 26 is a sectional view taken along the line 26—26 of FIG. 25.

The cover member 184 is provided on its lower surface with a shallow central cut-out or recess 188, the parallel opposite edges 190—190 of which are adapted to slightly overlap the vertical wall portions 192—192' of the assemblies 178 and 180, respectively, FIG. 25, in this manner provide a close and tight fit between all three members when they are assembled together. Ingress apertures 194—194 for reception therethrough of the potting or encapsulating material are drilled or otherwise formed in the cover 184 for communication with the other two assemblies 178 and 180.

For purposes to be explained presently, the upper edges of each of the members 178 and 180 are provided with opposite parallel shoulders or ledges 198—198 and 198'—198' respectively.

Located between the openings 194—194 in the cover 184 are two parallel holes or depressions 200—200, FIG. 25, forming receptacles into which the terminal forming and positioning members 167—167 are receivable so as to further strengthen and rigidify the transducer during the encapsulation thereof. Each of the central body forming portions 178 and 180 of the assembly is provided with a stepped chamber 202 and 204 cut or formed as an image of the external configuration of the transducer assembly. Oppositely disposed wing portions 206–206' open outwardly away therefrom and form angled channels interconnecting the holes 194 therewith. The central portion of each chamber 202 and 204 is flanked by a flat rectangular depression 208-208' respectively, into which the shim 170 is receivable thus providing means for further orienting, locating and fixedly maintaining the transducer assembly within the jig 176.

Oppositely disposed apertures 210–210' in respective blocks 170 and 180, axially aligned with the holes 200—200 in cover 184, permit the lower portions of terminal pins 167—167 to align therein further rigidifying the assembly for final encapsulation.

Figure 27:
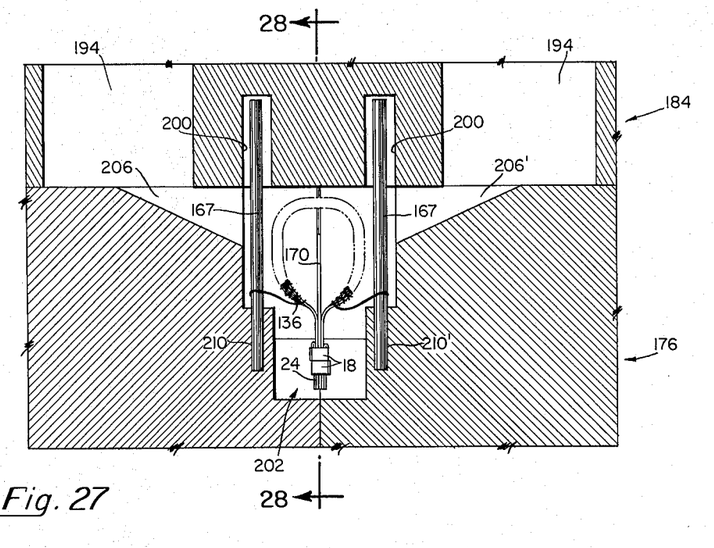
FIG. 27 is a sectional view of the jig of FIG. 24 with a transducer disposed therein for encapsulation.
Figure 28:
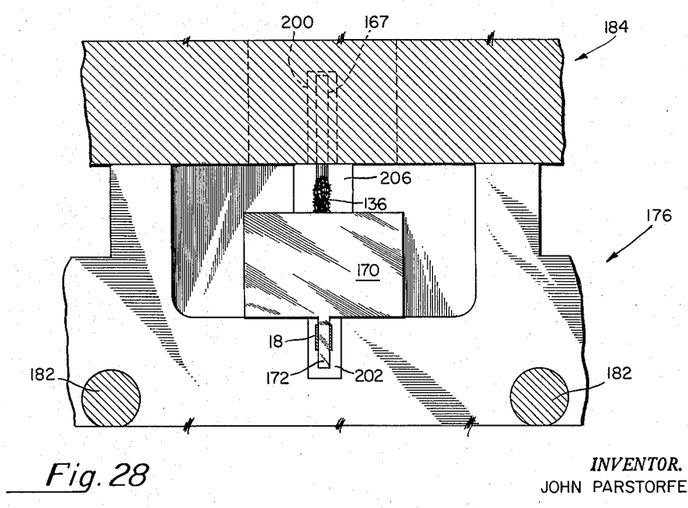
FIG. 28 is a front elevational view, partially in section, along the line 28—28 of FIG. 27.

With jig 176 in assembled condition, FIGS. 25-28, the transducer assembly is disposed therein as seen in FIGS. 27 and 28 with the opposite sides of the shim 170 received within the slot provided therefor and with the pins 167—167 located in the upper and lower holes 200 and 210–210' respectively.

Encapsulating material 212, FIGS. 29-34, such as epoxy resin of suitable viscosity may now be poured through the openings 194 to flow downwardly over the slanted floor of wings 206-206' so as to surround and enclose and thoroughly encompass the transducer assembly.

The apertures 200—200 in the cover 184 when the latter is assembled together with members 176 and 178 provide relief areas within which ambient air is trapped. When the encapsulating material is poured into the molding jig the trapped air effectively blocks the molding material below the level of the central body portion of the cover and thereby prevents it from touching or contaminating the upper ends of the members 167—167. Once cleaned and made ready for soldering, etc., the members 167—167 remain free of any local debris or contamination.

Figure 29:
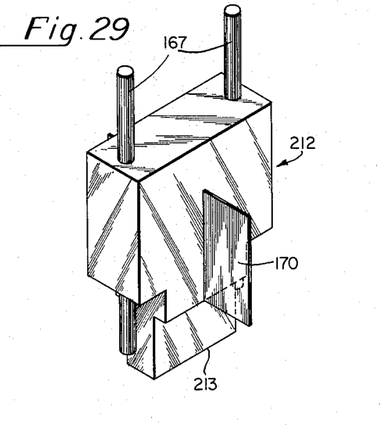
FIGS. 29 and 30 are views of a transducer before and after the excess shim and pin conductor stock is removed.
Figure 30:
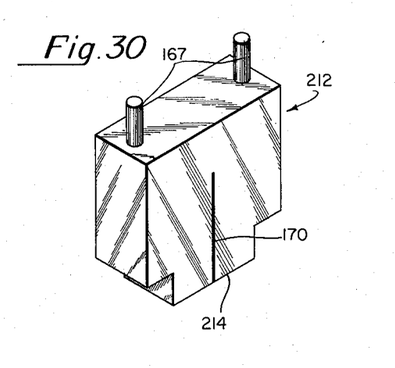
Figure 31:
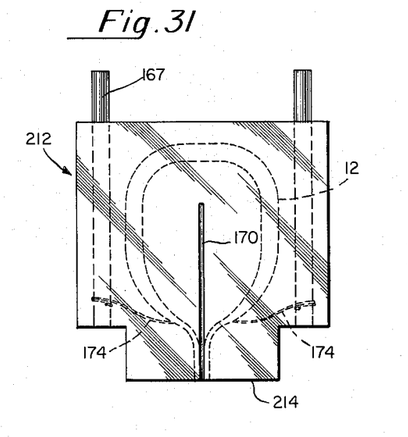
FIG. 31 is a view of the transducer with the energizing leads attached thereto.
Figure 32:
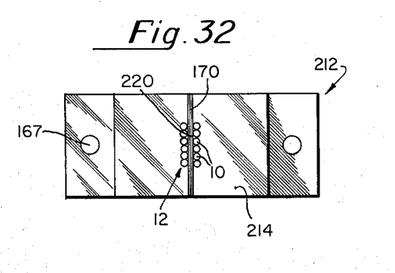
FIG. 32 is a view of the gap end of the device of FIG. 31.

After the encapsulating material has hardened sufficiently, the mold may be broken at its junctures by removing the bolts and separating the parts from each other exposing the transducer to view, as seen in FIG. 29. Thereafter, the excess shim stock is removed, FIG. 30, and the lower portion 213 of the transducer, including the members 24—24 which were wrapped around the bundle of wires 10 to hold the same together, are cut off, FIG. 31, to form a flat surface portion 214 which, in the final assembly, becomes the operating end of the head, as seen most clearly in FIG. 32.

Figure 33:
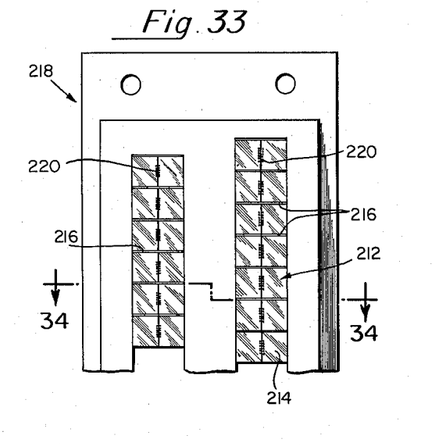
FIG. 33 is a plan view of a portion of a multi-channel transducer assembly or stick; and, FIG. 34 is a sectional view along the line 34—34 of FIG. 33.
Figure 34:
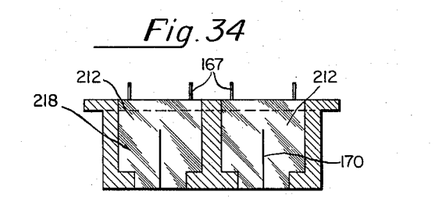

As beforementioned, each recording "head" may be disposed in side by side relationship with other similar heads in a single or in a double row, as shown for example, in FIGS. 33 and 34. In order to insulate each transducer from its adjacent contiguous neighbor, a dielectric element 216 is or may be introduced between each pair of transducers in the stick assembly 218. In this manner any magnetic-electric interaction between the various heads may be held to a minimum and the structure further rigidified thereby. It is noted that the operating gaps 220 of one row of heads are offset or displaced slightly with respect to the operating gaps 220 of the adjacent parallel row of heads. The plurality of heads may be cast or molded in the frame or "stick" 218 in FIG. 33. This arrangement is merely suggestive of a manner in which the apparatus may be used. Other and different arrangements may be chosen to suit specific applications. Nevertheless, the arrangement hereinbefore described will operate efficiently at .001 or .050 in center-to-center track spacing. The recording head stick or frame 218 may be used as a reading or writing assembly, or both alternately. The recording frame is ruggedly constructed giving long lasting reliable performance.

The present invention, as hereinbefore described, is useful, for example, in recording information on or reading information from a disc, tape or drum-type memory storage unit (not shown). The techniques set forth are adaptable to produce an extremely small size electromagnetic transducer assembly wherein each read-record head on the order of .250 x .250 x .100 inches. The individual transducer resulting from such techniques is especially suitable for use where extremely high sensitivity, high resolution and high frequency operation, up to approximately five megacycles per second is required, or desirable. As beforementioned, a plurality of such transducers may be grouped together in parallel side by side relation to form a recording bar, gang or stick. These bars or sticks may also be placed in side by side parallel arrangement with other similar bars, sticks, etc. to form compacted group assemblies so that reading and/or writing may be performed in an interlaced fashion with respect to the data tracks on the storage media, e.g., recording disc, tape or drum. Such recording tracks are or may be spaced at .100 inch or respectively at .050 inch centers thus considerably increasing the memory capacity by virtue of the increase in packing density of the transducer-forming elements of the assembly.

The present invention lends itself very well to an electrical circuit arrangement wherein the energizing windings for the various transducers in the stick assembly 218 could be in series or in parallel or both as desired. For example, in operating the "stick" with a magnetizable tape it might be desirable and/or more efficient to employ a series arrangement for different operational functions such as erasing, writing and recording. Regardless of the design the present transducer assembly is completely adaptable and operates equally efficient in all three situations.

The foregoing progressive production procedures permit the manufacture of uniformly constructed electromagnetic transducers with substantially identical characteristics from one to another. The process is applicable for hand or automatic assembly techniques and the method is basically simple, thus resulting in lowering manufacturing costs for miniature-type recording heads to an economical price range.

What is claimed is:
1. An electromagnetic transducer for reading or recording high frequency magnetic information respectively from or on a tape, disc or drum comprising:
 (a) a bundle of continuous, discrete, similar length insulated wires of magnetic material having the mid portions thereof twisted upon one another for at least once about their long axes,
 (b) said bundle of wire elements being bent into a toroidal shape with the opposite end portions brought together in parallel spaced confronting arrangement so that these portions are adjacent to but slightly spaced from each other to form a pole gap therebetween,
 (c) non-magnetic spacer means filling said pole gap,
 (d) electrically conductive wire wrapped around the twisted mid-portion of said bundle of elements forming an inductive electrical signal input-output assembly therewith, and
 (e) electrical connector means attached to the ends of said electrically conductive signal assembly and extending away therefrom for interconnection to a utilization device whereby said transducer may function to either read or record.

2. An electromagnetic transducer for reading or recording high frequency magnetic information respectively from or upon a tape, drum or disc, comprising:
   (a) a bundle of continuous, discrete, similar length insulated wire elements of magnetic material having the mid portions thereof twisted upon one another through an arc of at least 360° about their long axes,
   (b) said wire elements being bent into a horse-shoe shape with the opposite end portions brought together in parallel, straight, confronting arrangement so that these end portions are adjacent to but slightly spaced from each other to form a pole gap therebetween,
   (c) non-magnetic metallic spacer means filling said pole gap,
   (d) winding turns of electrically conductive wire encircling the twisted mid portions of said magnetic wire elements forming an inductive electrical signal input-output assembly therewith,
   (e) means hermetically encapsulating the transducer to form a sealed assembly, and
   (f) electrical connector means attached to the ends of said electrically conductive input-output assembly and extending externally of said encapsulating means for interconnection to a utilization device whereby said transducer may function to either read or record.

3. An electromagnetic transducer assembly for reading or recording magnetic data respectively from or upon a tape, drum or disc including a plurality of individual transducer members each of which comprises:
   (a) a bundle of continuous, discrete, elongated wire-like magnetic elements disposed in side by side arrangement,
   (b) said bundle being axially twisted about itself throughout the major part of its length leaving the wire-like elements of each end of the bundle untwisted and extending parallel to one another in a single plane,
   (c) an induction coil for said transducer having input and outputs ends, said coil being overlaid on said twisted part of said bundle of wire-like elements so as to extend approximately the full length of this part of the bundle, said bundle being bent into the general shape of a horseshoe having the opposite untwisted ends brought together so that the respective planes of the wire-like elements thereof extend radially of the horseshoe shape and in close parallel proximity to one another and confining the lines of magnetic flux into an extremely small, well-defined area forming an air gap,
   (d) a non-magnetic spacing shim disposed in the air gap between the planes of said opposite ends of the bundle so that the magnetic flux lines are obliged to bridge the very small area between the ends of the bundle as defined by the air gap,
   (e) means mounting said transducers in side by side parallel relationship, and
   (f) dielectric means hermetically sealing said assembly of transducer members from the atmosphere but providing electrical communication of the input and output ends of the coil externally of the dielectric sealing means for operative association with a utilization device.

4. An electromagnetic transducer assembly for reading or recording high frequency magnetic information respectively from or upon a tape, disc or drum comprising:
   (a) a bundle of continuous, discrete, elongated wire-like magnetic elements disposed in tightly packed single row side by side arrangement,
   (b) said bundle being axially twisted about itself throughout the major part of its length leaving the ends thereof untwisted,
   (c) an induction coil for said transducer having input and output ends, said coil being overlaid on said twisted part of said bundle of wire-like elements so as to extend approximately the full length of this part of said bundle, said bundle being bent into horseshoe shape bringing the opposite ends of said bundle together in close parallel proximity, so as to confine the lines of magnetic flux into an extremely small, well-defined area forming an air gap,
   (d) a non-magnetic spacing shim disposed between said opposite ends within said air gap so that the magnetic flux lines are obliged to bridge the very small area between the ends of the bundles as defined by the air gap, and
   (e) dielectric means hermetically sealing said assembly from the atmosphere but providing electrical communication of the input and output ends of the coil externally of the dielectric sealing means for operative association with a utilization device.

References Cited by the Examiner

UNITED STATES PATENTS

| | | | |
|---|---|---|---|
| 2,668,878 | 2/1954 | Munroe | 179—100.2 |
| 2,674,031 | 4/1954 | Buhrendorf | 29—155.57 |
| 2,674,659 | 4/1954 | Buhrendorf | 179—100.2 |
| 2,676,392 | 4/1954 | Buhrendorf | 29—155.58 |
| 2,677,019 | 4/1954 | Buhrendorf | 179—100.2 |
| 2,702,833 | 2/1955 | Camras | 179—100.2 |
| 2,839,613 | 6/1958 | Greene | 179—100.2 |
| 2,895,014 | 7/1959 | Johnson | 179—100.2 |
| 3,005,879 | 10/1961 | Moehring | 179—100.2 |

FOREIGN PATENTS 424,765  2/1935  Great Britain.

BERNARD KONICK, *Primary Examiner.*

ELI J. SAX, *Examiner.*

IRVING L. SRAGOW, D. G. REDINBAUGH, *Assistant Examiners.*